United States Patent
Yang et al.

(10) Patent No.: US 11,444,655 B2
(45) Date of Patent: Sep. 13, 2022

(54) ELECTRONIC DEVICE FOR ADJUSTING PEAK VOLTAGE OF UWB TRANSMISSION SIGNAL BASED ON FRAME LENGTH OF DATA AND OPERATION METHOD THEREOF

(71) Applicant: Samsung Electronics Co., Ltd., Gyeonggi-do (KR)

(72) Inventors: Yi Yang, Gyeonggi-do (KR); Hyunchul Kim, Gyeonggi-do (KR); Sehwan Choi, Gyeonggi-do (KR); Sukgi Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/748,990

(22) Filed: Jan. 22, 2020

(65) Prior Publication Data

US 2020/0382158 A1 Dec. 3, 2020

(30) Foreign Application Priority Data

May 31, 2019 (KR) ........................ 10-2019-0064881

(51) Int. Cl.
*H04B 1/7163* (2011.01)
*H04B 1/717* (2011.01)

(52) U.S. Cl.
CPC ......... *H04B 1/71632* (2013.01); *H04B 1/717* (2013.01); *H04B 1/71635* (2013.01)

(58) Field of Classification Search
CPC ..... H04L 67/12; H04L 25/4902; H04L 67/22; H04L 1/0057; H04L 25/00;
(Continued)

(56) References Cited

U.S. PATENT DOCUMENTS

| | | | |
|---|---|---|---|
| 6,775,331 B1 | 8/2004 | Shinde | |
| 8,204,036 B2 * | 6/2012 | Russell | H04W 88/06 370/350 |

(Continued)

FOREIGN PATENT DOCUMENTS

| | | |
|---|---|---|
| EP | 2326021 A1 | 5/2011 |
| JP | 2006-050396 A | 2/2006 |

(Continued)

OTHER PUBLICATIONS

Sonom Olonbayar et al; "Board implementation and its performance for IR-UWB IEEE.802.15.4a from multiple ASIC chips"; Apr. 2012; https://www.researchgate.net/publication/259676180_Board_implementation_and_its_performance_for_IR-UWB_IEEE802154a_from_multiple_ASIC_chips>.

(Continued)

*Primary Examiner* — Golam Sorowar
(74) *Attorney, Agent, or Firm* — Cha & Reiter, LLC

(57) ABSTRACT

In an electronic device and an operation method thereof according to certain embodiments, the electronic device may include: a first communication circuit configured to perform a first communication using an ultra-wide band (UWB) communication scheme and a processor. The processor may control the communication circuit to: identify, based on a characteristic of data to be transmitted using the first communication circuit, a frame length of the data to be transmitted; determine, based on the identified frame length, a peak voltage of a signal containing the data to be transmitted; and transmit the data using the signal having the determined peak voltage.

19 Claims, 12 Drawing Sheets

(58) Field of Classification Search
CPC .............. H04L 25/03834; H04L 27/22; H04L 27/2647; H04L 5/0044; H04L 7/00; H04L 7/0091; H04L 7/033; H04L 27/0004; H04L 63/0492; H04L 67/06; H04L 67/125; H04L 63/14; H04L 63/1416; H04B 1/1615; H04B 1/385; H04B 1/717; H04B 1/7183; H04B 1/7163; H04B 1/71632; H04B 1/7174; H04B 5/0031; H04B 5/0037; H04B 5/02; H04B 17/309; H04B 17/318; H04W 84/12; H04W 12/63; H04W 24/00; H04W 28/18; H04W 4/38; H04W 74/00; H04W 80/02; H04W 4/21; H04W 4/70; H04W 4/80; H04W 48/08; H04W 48/16; H04W 4/021; H04W 52/0203; H04W 56/001

See application file for complete search history.

(56) References Cited

U.S. PATENT DOCUMENTS

| | | |
|---|---|---|
| 9,444,364 B2 | 9/2016 | Zheng et al. |
| 2002/0141505 A1* | 10/2002 | Lundby .................. H04L 27/34 375/261 |
| 2007/0127424 A1* | 6/2007 | Kwon .................. H04L 1/1614 370/338 |
| 2007/0147477 A1* | 6/2007 | Cavallaro .......... H04B 1/71635 375/130 |
| 2007/0153754 A1* | 7/2007 | Shapira ................. H04W 16/10 370/338 |
| 2010/0195499 A1* | 8/2010 | Dattagupta ........ H04N 21/2381 370/235 |
| 2011/0068765 A1* | 3/2011 | Segoria ................ H04B 1/1607 323/313 |
| 2011/0122925 A1* | 5/2011 | Pflug .................... H04B 1/7174 375/146 |
| 2014/0191713 A1 | 7/2014 | Hong et al. |
| 2014/0205299 A1 | 7/2014 | Hongou |
| 2014/0368053 A1 | 12/2014 | Lee et al. |
| 2017/0294883 A1 | 10/2017 | Kang et al. |

FOREIGN PATENT DOCUMENTS

| | | |
|---|---|---|
| KR | 10-2014-0090024 A | 7/2014 |
| WO | 2013/111917 A1 | 8/2013 |

OTHER PUBLICATIONS

Vastenholt, MJ; "ASub-GHz UWB Correlation Receiver for Wireless Biomedical Communication"; Sep. 29, 2014; https://repository.tudelft.nl/islandora/object/uuid%3A8feeef74-c921-4683-a5a4-a2fa9f5506c0>.

International Search Report dated Apr. 22, 2020.

Tony Fagan (Decawave) et al.; "HRP data mode options"; Jul. 9, 2018; pp. 1-16; XP068129177; https//mentor.ieee.org/802.15/dcn/18/15-18-0323-00-004z-hrp-datamode-options.pptx.

Frank Leong (NXP Semiconductors); "EIRP Considerations"; Sep. 12, 2018; pp. 1-12; XP068129307; https://mentor.ieee.org/802.15/dcn/18/15-18-0457-00-004z-eirpconsiderations.pptx.

Holst Centre / IMEC; "Low Power Considerations for 15.4z"; Jan. 11, 2019; pp. 1-13; XP068148454; https://mentor.ieee.org/802.15/dcn/19/15-19-0007-00-004z-low-powerconsiderations-for-15-4z.ppt.

European Search Report dated Oct. 6, 2020.

\* cited by examiner

Data symbol struct at 249.6 MHz PRF

FIG. 7B

| HPRF Set # | SYNC PSR | SFD # per Table 30 | SFD Length | STS number of Segments | STS Segment Length (units of 512 chips) | PHR + data | Data Rate (Mb/s) |
|---|---|---|---|---|---|---|---|
| 1 | 64 | 2 | 8 | 0 | n/a | Yes | 6.8 |
| 2 | 32 | 2 | 8 | 0 | n/a | Yes | 6.8 |
| 3 | 64 | 3 | 16 | 0 | n/a | Yes | 6.8 |
| 23 | 64 | 3 | 16 | 1 | 128 | No | n/a |
| 24 | 64 | 3 | 16 | 2 | 128 | No | n/a |
| 25 | 64 | 2 | 8 | 2 | 32 | No | n/a |
| 26 | 32 | 2 | 8 | 1 | 64 | No | n/a |
| 27 | 32 | 2 | 8 | 2 | 64 | No | n/a |
| 28 | 32 | 2 | 8 | 1 | 32 | No | n/a |
| 29 | 32 | 2 | 8 | 2 | 32 | No | n/a |
| 30 | 32 | 1 | 4 | 1 | 32 | No | n/a |
| 31 | 32 | 1 | 4 | 2 | 32 | No | n/a |

ELECTRONIC DEVICE FOR ADJUSTING PEAK VOLTAGE OF UWB TRANSMISSION SIGNAL BASED ON FRAME LENGTH OF DATA AND OPERATION METHOD THEREOF

CROSS-REFERENCE TO RELATED APPLICATION(S)

This application is based on and claims priority under 35 U.S.C. 119 to Korean Patent Application No. 10-2019-0064881, filed on May 31, 2019, in the Korean Intellectual Property Office, the disclosure of which is herein incorporated by reference in its entirety.

BACKGROUND

1) Field

One or more embodiments disclosed herein generally relate to an electronic device and an operation method thereof, and particularly to technology for adjusting the peak voltage of a signal transmitted through ultra-wide band (UWB) communication.

2) Description of Related Art

Various electronic devices, such as smart phones, tablet PCs, portable multimedia players (PMPs), personal digital assistants (PDAs), laptop personal computers, and wearable devices, have become increasingly popular.

Recently, advances have been made on technologies supporting ultra-wide band (UWB) communication for these electronic devices. For example, technologies for measuring the positions of the electronic devices through UWB communication between electronic devices and providing various services (e.g. authentication services) using the measured positions have been developed. UWB communication may use a wider bandwidth than other communication schemes. Position measurement service using UWB communication may have smaller error rates than, for example, GPS position measurement services.

Communication-frequency governing authorities in countries around the world impose restrictions on the characteristics of the UWB signal. For example, the Federal Communications Commission (FCC) in the United States restricts the maximum average power of a UWB signal to −41.3 dBm/MHz and restricts the peak power to 0 dBm/MHz.

The above information is presented as background information only to assist with an understanding of the disclosure. No determination has been made, and no assertion is made, as to whether any of the above might be applicable as prior art with regard to the disclosure.

SUMMARY

In order to comply with the above-described restrictions of UWB communication, signals transmitted through UWB communication may be kept at constant intensity. However, if the peak voltage of the signals remains constant even when the peak voltage can be increased, the transmission quality of the signals may not be improved.

An electronic device according to an embodiment includes: a first communication circuit configured to perform a first communication using an ultra-wide band (UWB) communication scheme and a processor. The processor may control the communication circuit to: identify, based on a characteristic of data to be transmitted using the first communication circuit, a frame length of the data to be transmitted; determine, based on the identified frame length, a peak voltage of a signal containing the data to be transmitted; and transmit the data using the signal having the determined peak voltage.

An operation method of an electronic device according to an embodiment may include: generating data to be transmitted using a first communication circuit configured to perform a first communication using an ultra-wide band (UWB) communication scheme; identifying a frame length of the generated data; determining, based on the identified frame length, a peak voltage of a signal containing the data to be transmitted; and transmitting the data using the signal having the determined peak voltage.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 7B shows a table containing various parameters of the data to be transmitted according to an embodiment.

DETAILED DESCRIPTION

The electronic device and the operation method thereof according to certain embodiments may adaptively change the peak voltage of a UWB signal depending on the frame length of the data. Therefore, the transmission quality and the maximum reach distance of the signal can be increased by increasing the peak voltage of the signal when appropriate.

The electronic device and the operation method thereof according to certain embodiments can increase the transmission quality and the maximum reach distance of the signal by increasing the peak voltage of the signal while also complying with restrictions on the maximum average power or the maximum peak power.

Figure 1:
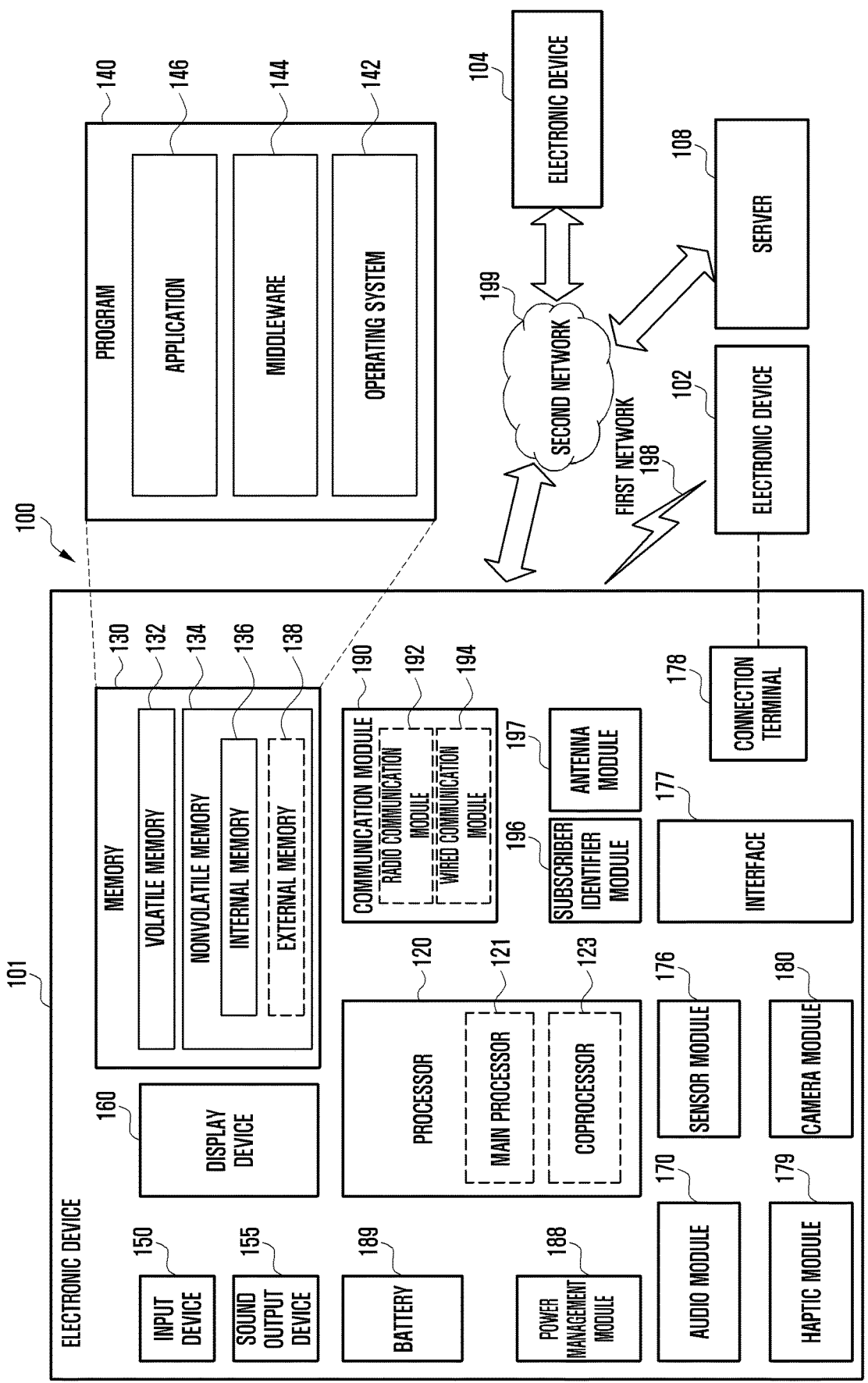
FIG. 1 is a block diagram of an electronic device according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
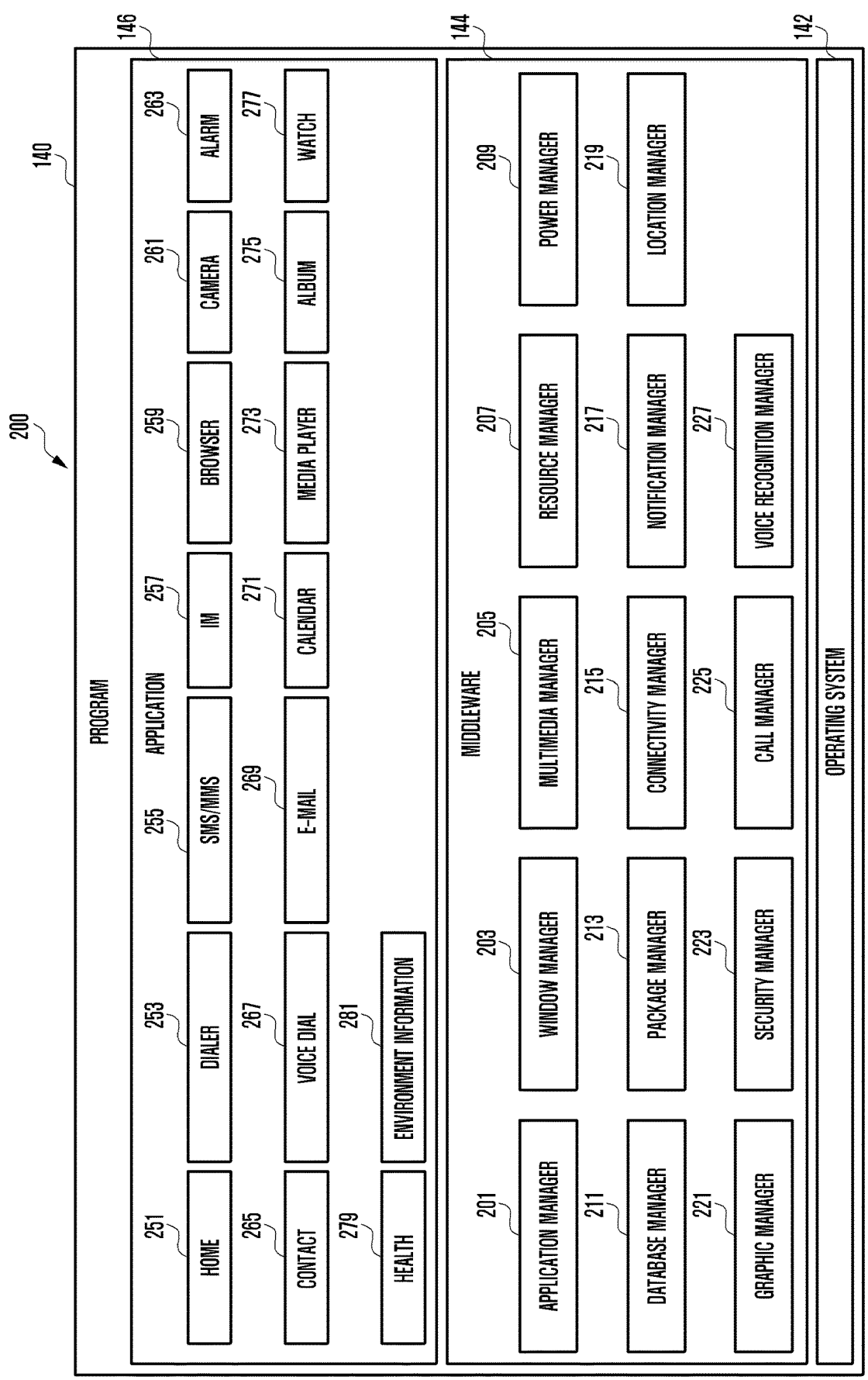
FIG. 2 is a block diagram of a program according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home application 251, dialer application 253, short message service (SMS)/multimedia messaging service (MMS) 255, instant message (IM) application 257, browser application 259, camera application 261, alarm application 263, contact application 265, voice recognition application 267, email application 269, calendar application 271, media player application 273, album application 275, watch application 277, health application 279 (e.g., for measuring the degree of workout or biometric information, such as blood sugar), or environmental information application 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
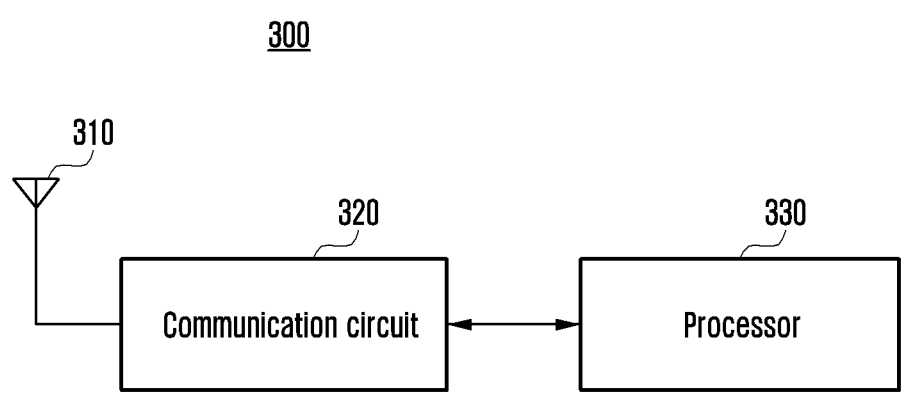
FIG. 3 is a block diagram of an electronic device according to an embodiment.

FIG. 3 is a block diagram of an electronic device according to an embodiment.

Referring to FIG. 3, an electronic device 300 (e.g. the first electronic device 101 in FIG. 1) according to an embodiment may include an antenna 310 (e.g. the antenna module 197 in FIG. 1), a communication circuit 320 (e.g. the communication module 190 in FIG. 1), and a processor 330 (e.g. the processor 120 in FIG. 1). The processor 330 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the antenna 310 may transmit or receive signals using various communication standards. One such communication standard may be ultra-wide band or UWB communication. UWB communication in turn may refer to several different communication methods for transmitting information at relatively lower power by using wider frequency bands (e.g. frequency bands of 3.1 GHz to 10 GHz) than other communication methods.

According to an embodiment, the electronic device 300 may acquire position information of an external electronic device (not shown) transceiving UWB data using a UWB signal output or received by the antenna 310. When the electronic device 300 acquires the position information of the external electronic device through UWB communication, the position information of the external electronic device may be more accurate relative to other methods of obtaining position information. For example, the actual position error of the external electronic device obtained via UWB may be in the order or centimeters.

According to an embodiment, the communication circuit 320 is electrically connected to the processor 330, and may transmit signals received through the antenna 310 to the processor 330. The communication circuit 320 is electrically connected to the antenna 310, and may transmit, to the antenna 310, signals including data to be transmitted through UWB communication.

According to an embodiment, characteristics of the UWB signals may be regulated by standards established by the FCC in the United States. For example, the FCC has defined that the maximum average power of UWB signals to be −41.3 dBm/MHz and the peak power to be 0 dBm/MHz. UWB signals must satisfy the maximum average power and peak power defined by the FCC. UWB signals are typically transmitted at relatively lower power than signals of other communication methods. In view thereof, conventionally UWB signals may be transmitted with a constant peak voltage, to address the worst-case scenario in which the transmission or reception of the signals may be difficult, for example if the transmission is blocked because the electronic device outputting the UWB signal is shielded by a container such as a handbag. The constant peak voltage may be determined to be close to the maximum average power and the peak power regulated by the FCC. However, conventional technologies also maintain constant peak power magnitude. Since conventional technologies maintain the peak voltage of the signal to be constant even when it is possible to increase the peak voltage, the conventional technologies may not increase the transmission quality of the signal.

Hereinafter, descriptions will be made regarding the output of a UWB signal while changing the peak voltage of the signal so as to be adaptable to a particular situation.

According to an embodiment, the processor 330 may identify the frame length of data to be transmitted as a characteristic of the data to be transmitted. The frame length may refer to the difference between the data transmission start time and the data transmission completion time.

According to an embodiment, the data to be transmitted may be generated by the processor 330 according to standards defined by the Institute of Electrical and Electronics Engineers (IEEE), such as 802.15.4. The data may include one or more of various fields such as sync data (SYNC) for temporal synchronization between the transmitting electronic device 300 and a receiving external electronic device (not shown); a physical payload (PHY) including data to be transmitted; a PHY header (PHR) referring to a header portion of the PHY; a start-of-frame delimiter (SFD) indicating the end of the SYNC and the start of the PHR; and a scrambled timestamp secure (STS) configured to prevent an attack (e.g. a relay attack) on the data.

According to an embodiment, the characteristics of data to be transmitted may be identified while information (e.g. UWB parameters exchanged in operation 721 of FIG. 7A) related to the data to be transmitted is received from the external electronic device. According to another embodiment, the characteristics of data to be transmitted may be identified while the data is generated.

According to an embodiment, the processor 330 may identify the frame length based on the characteristics of the data to be transmitted. A detailed example for identifying the frame length will be described later with reference to FIGS. 4A and 4B.

According to an embodiment, the processor 330 may determine a peak voltage of a signal on the basis of the identified frame length. The signal may include the data to be transmitted. The processor 330 may increase the peak voltage of the signal as the identified frame length decreases. That is because signal output time decreases when the frame length decreases and thus a preconfigured condition (e.g. the maximum average power defined by the FCC) can be satisfied even though the peak voltage is increased.

According to an embodiment, the processor 330 may determine the peak voltage such that the average power of the signal does not exceed a preconfigured value (e.g. the maximum average power defined by the FCC). According to another embodiment, the processor 330 may determine the peak voltage such that the maximum output power of the signal does not exceed a preconfigured value (e.g. the peak power defined by the FCC).

According to an embodiment, the processor 330 may adaptively adjust the peak voltage of the signal according to the frame length. Therefore, the peak voltage of the signal may be dynamically increased so that transmission quality and the maximum reach distance of the signal can be increased.

A detailed embodiment for determining the peak voltage of the signal will be described below with reference to FIGS. 5A to 5C.

According to an embodiment, the processor 330 may transmit data through a signal having the determined peak voltage. The processor 330 may control the communication circuit 320 to output the signal having the determined peak voltage. The communication circuit 320 may control, under the control of the processor 330, the antenna 310 to output the signal having the determined peak voltage.

According to an embodiment, the processor 330 may be at least one of a communication processor (e.g. the auxiliary processor 123 in FIG. 1) or an application processor (e.g. the main processor 121 in FIG. 1).

Figure 4A:
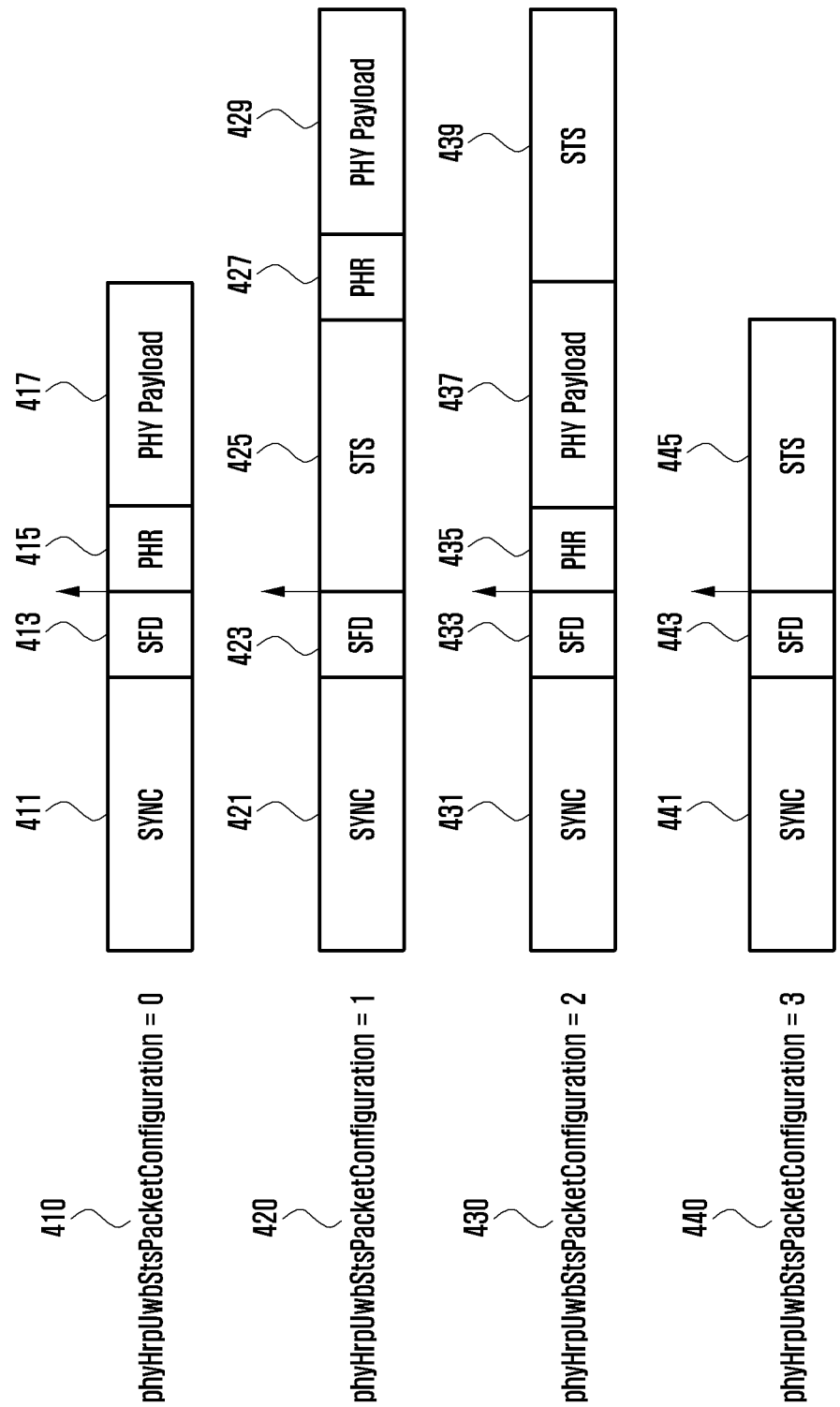
FIG. 4A illustrates an embodiment in which a frame length is determined based on the characteristics of data to be transmitted in an electronic device according to an embodiment.
Figure 4B:
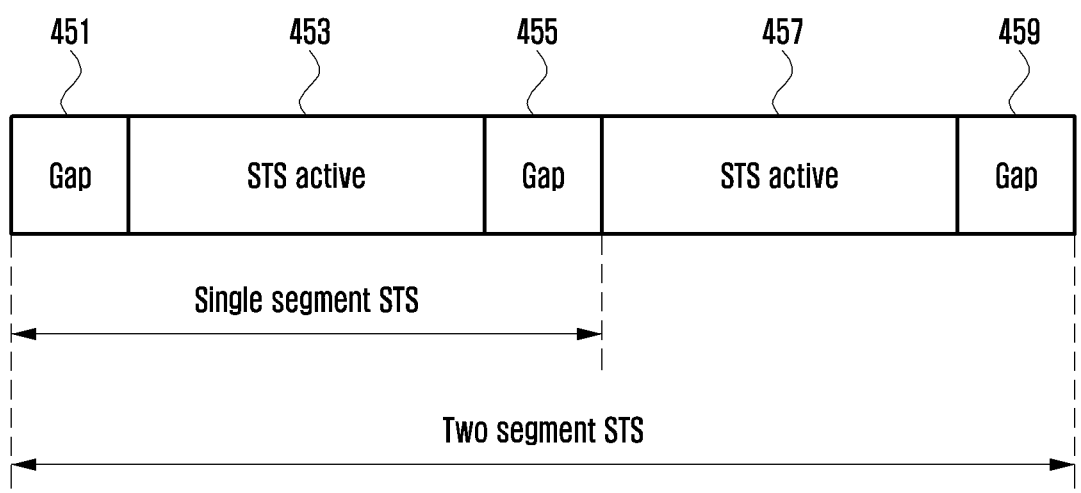
FIG. 4B illustrates a scrambled timestamp secure (STS) according to an embodiment.

FIG. 4A illustrates an embodiment in which a frame length is determined based on the characteristics of data to be transmitted in an electronic device according to an embodiment, and FIG. 4B illustrates a scrambled timestamp secure (STS) according to an embodiment.

FIG. 4A illustrates packets as defined by the standard IEEE 802.15.4. FIG. 4A illustrates four configurations in which the PHY protocol data unit (PPDU) included in data to be transmitted through UWB communication can be implemented.

According to an embodiment, data may be implemented as a first PPDU 410. The data implemented as the first PPDU 410 may include fields sync data (SYNC) 411 for temporal synchronization between the transmitting electronic device 300 and a receiving external electronic device (e.g. the electronic device 102 in FIG. 1); a physical payload (PHY) 417 including data to be transmitted; a PHY header (PHR) 415 referring to a header portion of the PHY 417; and a start-of-frame delimiter (SFD) 413 indicating the end of the SYNC and the start of the PHR.

According to an embodiment, data may be implemented as a second PPDU 420. The data implemented as the second PPDU 420 may include sync data (SYNC) 421 for temporal synchronization between the transmitting electronic device 300 and a receiving external electronic device; a physical payload (PHY) 429 including data to be transmitted; a PHY header (PHR) 427 referring to a header portion of the PHY 429; a start-of-frame delimiter (SFD) 423 indicating the end of the SYNC and the start of the PHR; and a scrambled timestamp secure (STS) 425 configured to prevent an attack (e.g. a relay attack) on the data.

According to an embodiment, data may be implemented as a third PPDU 430. The data implemented as the third PPDU 430 may include sync data (SYNC) 431 for temporal synchronization between the transmitting electronic device 300 and a receiving external electronic device; a physical payload (PHY) 437 including data to be transmitted; a PHY header (PHR) 435 referring to a header portion of the PHY 437; a start-of-frame delimiter (SFD) 433 indicating the end of the SYNC and the start of the PHR; and a scrambled timestamp secure (STS) 439 configured to prevent an attack (e.g. a relay attack) on the data.

According to an embodiment, data may be implemented as a fourth PPDU 440. The data implemented as the fourth PPDU 440 may include sync data (SYNC) 441 for temporal synchronization between the transmitting electronic device 300 and a receiving external electronic device; a start-of-frame delimiter (SFD) 443 indicating the end of the SYNC and the start of STS; and a scrambled timestamp secure (STS) 445 configured to prevent an attack (e.g. a relay attack) on the data.

According to an embodiment, data may be implemented as one of the configurations of the first PPDU 410, the second PPDU 420, the third PPDU 430, or the fourth PPDU 440. When data is implemented as one among the first PPDU 410, the second PPDU 420, the third PPDU 430, or the fourth PPDU 440, the frame length of the data may be determined to be the sum of the lengths of elements included in data. Hereinafter, a detailed method for determining the lengths of the elements will be described.

According to an embodiment, the length of the sync data 411, 421, 431, or 441 may be determined by Equation 1.

SYNC=SYNC number/delta length*preamble code length/pulse width*     [Equation 1]

where SYNC number is the number corresponding to the sync data selected among 16, 24, 48, 64, 96, 128, 256, 1024, or 4096; delta_length is one of 4, 8, 16, or 64; preamble code length is the length corresponding to a preamble code and is one of 31, 91, or 127; and pulse width is the time between two pulses.

According to an embodiment, the length of the SFD 413, 423, 433, or 443 may be determined by Equation 2.

SFD=SFD Length*delta length*preamblecode length*pulse width*     [Equation 2]

where SFD Length is the length of SFD, which may be one of 4, 8, 16, 32, or 64; delta_length is one of 4, 8, 16, or 64; preamble code length is the length corresponding to a preamble code and is one of 31, 91, or 127; and pulse width is the time between two pulses.

According to an embodiment, the length of the PHR 415, 427, or 435 may be determined by Equation 3.

PHR=19(bits)/PHR_rate*     [Equation 3]

where PHR_rate is the transmission rate of PHR, and may be one of 850 Kb/s, 110 Kb/s, or 6.8 Mb/s.

According to an embodiment, the length of the PHY 417, 428, or 437 may be determined by Equation 4.

PHY Payload=datasize(byte)*8/data_rate*     [Equation 4]

where datasize is the data size of PHY; and data_rate is the transmission rate of PHY.

According to an embodiment, the length of the STS 425, 439, or 445 may be determined by Equation 5.

STS=STS length*512*pulse width+(NSEG+1) *512*pulse width*     [Equation 5]

where STS_length is the length of STS active; and NSEG is the number of STS segments.

According to an embodiment, the structure of the STS 425, 439, or 445 may be implemented as in FIG. 4B.

Referring to FIG. 4B, the STS 425, 439, or 445 may include STS actives 453 and 457 and gaps 451, 455, or 459 between STS actives 453 and 457. NSEG in Equation 5 may refer to the number of the gaps, and the number of gaps may be one more than the number of STS actives 453 and 457.

According to an embodiment, the processor 330 may determine frame lengths of elements included in data using the above-described equations, and the total sum of the frame lengths of the elements may be determined as the frame length of the data. Hereinafter, descriptions will be made of a detailed embodiment in which the peak voltage of a signal is determined based on the frame length.

According to an embodiment, the processor 330 may determine a first voltage on the basis of the identified frame length and a maximum allowable average power (e.g. the maximum average power defined by the FCC) of the signal.

According to an embodiment, the first voltage may be determined based on a frame-length-related parameter ($L_{burst}$), maximum average power ($P_{avg}$), a margin voltage ($R_{margin}$), antenna load impedance ($Z_0$), a pulse repetition frequency (hereinafter, "PRF"), a resolution bandwidth (hereinafter, "RBW"), and an effective individual pulse width ($\tau_c$). For example, the first voltage may be determined based on Equation 6. The first voltage may be a voltage related to the maximum allowable average power.

$$\sqrt{\frac{P_{avg} R_{margin} L_{burst} 2 Z_0}{PRF * RBW * \tau_C^2 * G_{ant}}} \quad \text{[Equation 6]}$$

According to an embodiment, the effective individual pulse width may be determined based on Equation 7.

$$\tau_c = \left| \int_0^{\tau_c} \frac{p(t)}{V_{pk}} dt \right| \quad \text{[Equation 7]}$$

where p(t) is a function corresponding to the envelope of a pulse; $V_{pk}$ is the peak voltage of the signal; $t_c$ is an interval of time that depends on the energy of the signal (e.g. $t_c$ is 2.0032 ns if the signal has a frequency of 499.2 MHz, 0.9246 ns if the signal has a frequency of 1081.6 MHz, 0.7512 ns if the signal has a frequency of 1331.2 MHz, and 0.7380 ns if the signal has a frequency of 1354.97 MHz).

According to an embodiment, the frame-length-related parameter ($L_{burst}$) may vary based on a comparison between a frame length and a preconfigured value. For example, when the frame length is 1 ms or shorter, the frame-length-related parameter ($L_{burst}$) may be configured as 1 ms/frame length. In another example, when the frame length is 1 ms or longer, the frame-length-related parameter ($L_{burst}$) may be configured as a value of 1. Thus, the first voltage may decrease as the frame length increases.

According to an embodiment, the processor 330 may determine a second voltage on the basis of the maximum allowable peak voltage (e.g. the peak voltage defined by the FCC) of a signal.

According to an embodiment, the second voltage may be determined based on maximum peak power (Ppk), a margin voltage ($R_{margin}$), antenna load impedance ($Z_0$), a pulse desensitization correction factor ($\alpha_b$), and an antenna gain ($G_{ant}$). For example, the second voltage may be determined based on Equation 8. The second voltage may be a voltage related to the maximum allowable peak voltage.

$$\sqrt{\frac{P_{avg} R_{margin} 2 Z_0}{\alpha_b^2 * G_{ant}}} \quad \text{[Equation 8]}$$

The pulse desensitization correction factor will be described later with reference to FIGS. 5A, 5B, and 5C.

According to an embodiment, the processor 330 may determine which of the first voltage or the second voltage is lower, and use the lower voltage as the peak voltage of the signal, as shown in Equation 9.

$$V_{pk} = \min\left( \sqrt{\frac{P_{avg} R_{margin} L_{burst} 2 Z_0}{PRF * RBW * \tau_C^2 * G_{ant}}}, \sqrt{\frac{P_{avg} R_{margin} 2 Z_0}{\alpha_b^2 * G_{ant}}} \right) \quad \text{[Equation 9]}$$

Referring to Equation 9, the lower of the first voltage and the second voltage may be determined as the peak voltage. The processor 330 may determine the lower of the first voltage and the second voltage as the peak voltage, and thus may adjust, based on the length of data, the peak voltage while satisfying both the maximum allowable average power and the maximum allowable peak power stipulated by the FCC.

Referring to Equation 6 and Equation 9, the processor 330 may decrease the peak voltage when the pulse repetition frequency increases. The processor 330 may increase the peak voltage when the pulse repetition frequency decreases.

Referring to Equation 6 and Equation 9, the processor 330 may decrease the peak voltage when the frame length increases. The processor 330 may increase the peak voltage when the frame length decreases.

Figure 5A:
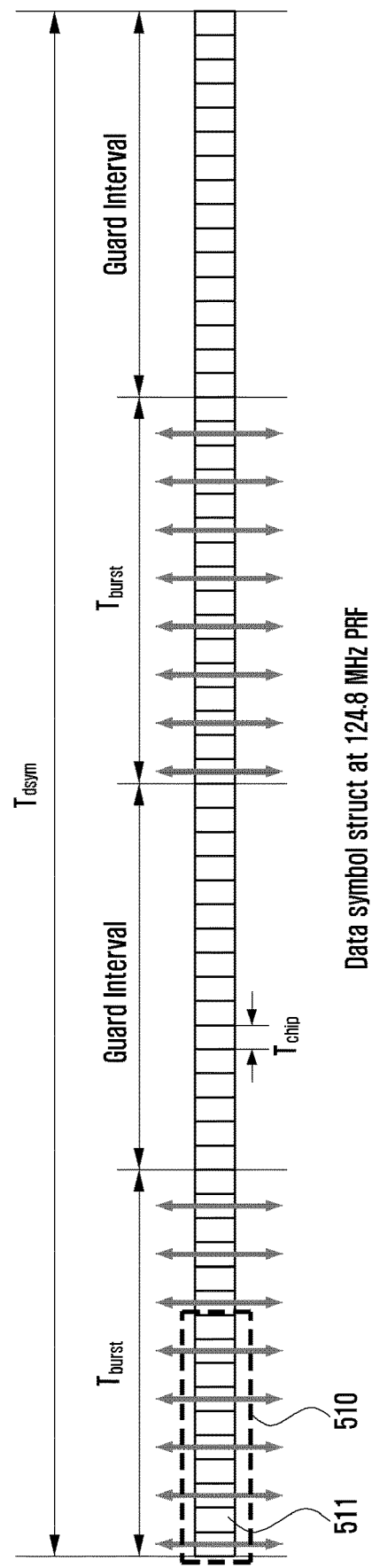
FIG. 5A illustrates an embodiment in which a parameter used to determine a peak voltage is determined in an electronic device according to an embodiment.
Figure 5B:
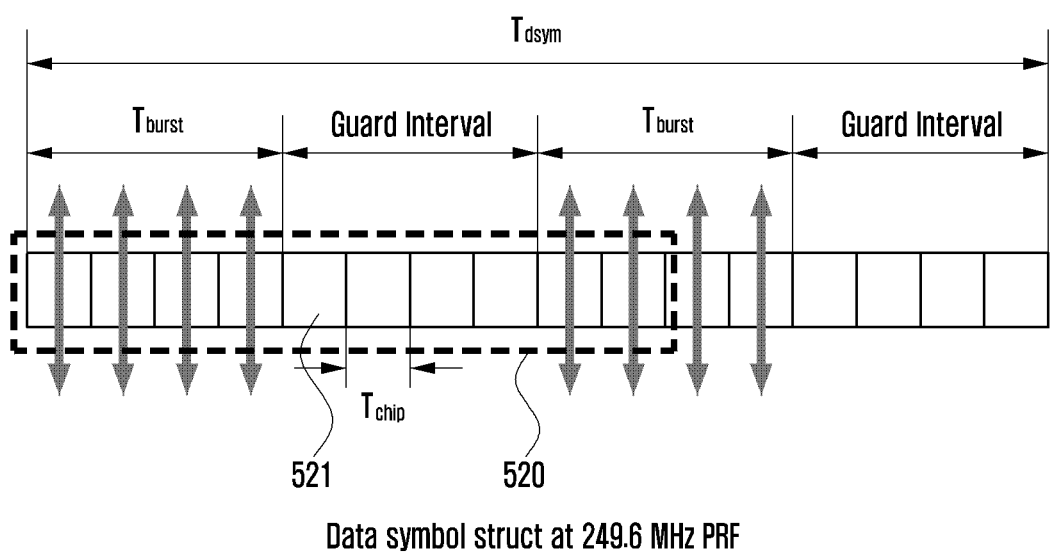
FIG. 5B illustrates an embodiment in which a parameter used to determine a peak voltage is determined in an electronic device according to another embodiment.
Figure 5C:
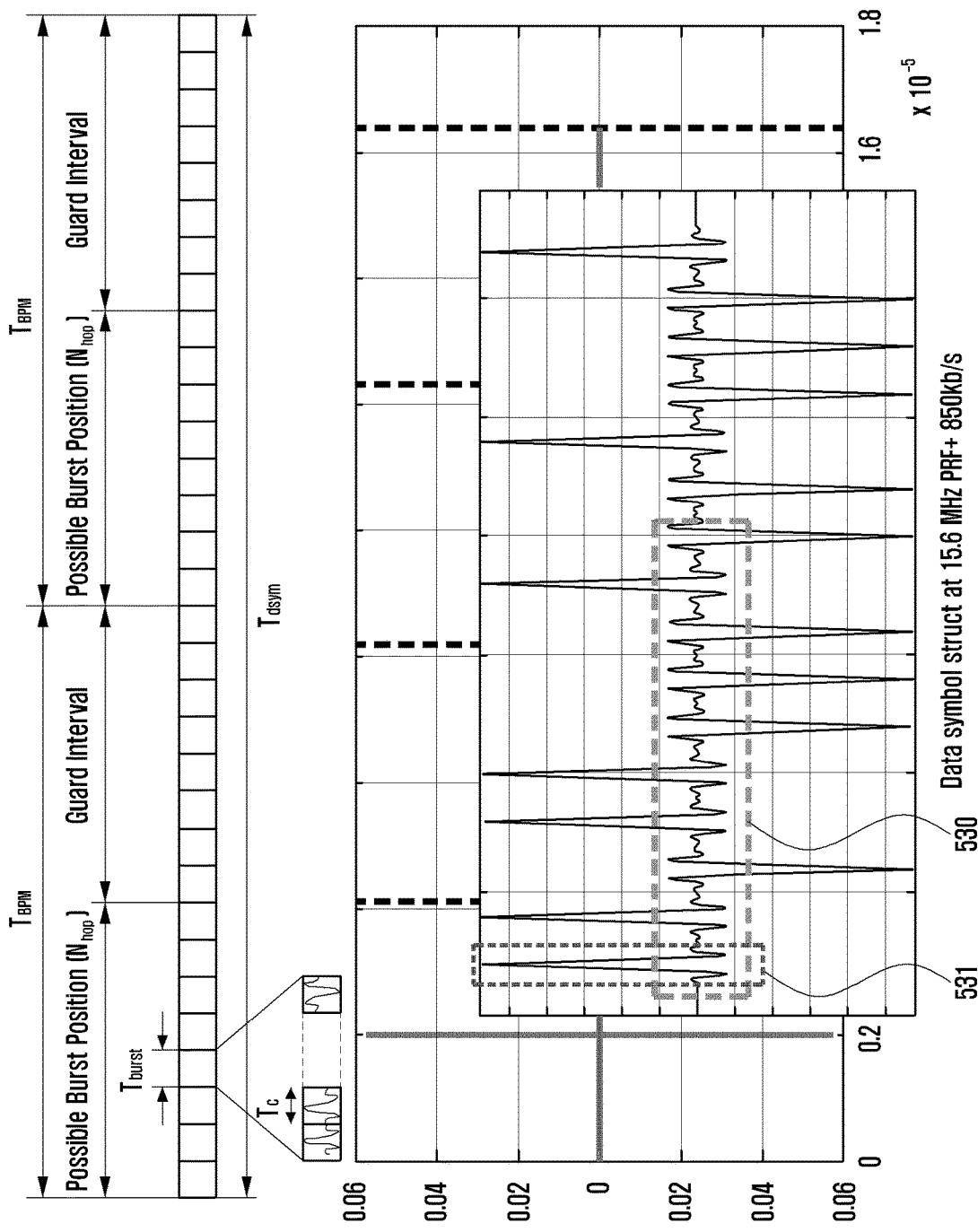
FIG. 5C illustrates an embodiment in which a parameter used to determine a peak voltage is determined in an electronic device according to yet another embodiment.

FIG. 5A illustrates an embodiment in which a pulse desensitization correction factor serving as a parameter used to determine a peak voltage is determined in an electronic device according to an embodiment, FIG. 5B illustrates an embodiment in which a pulse desensitization correction factor serving as a parameter used to determine a peak voltage is determined in an electronic device according to another embodiment, and FIG. 5C illustrates an embodiment in which a pulse desensitization correction factor serving as a parameter used to determine a peak voltage is determined in an electronic device according to yet another embodiment.

According to an embodiment, the pulse desensitization correction factor ($\alpha_b$) may be determined using Equation 10.

$$\alpha_b = 1 - 2Q\left(\frac{\tau_b}{2\sigma}\right) = 1 - 2Q\left(\tau_b * \sqrt{\frac{\pi}{2}} * k_{pulse} * RBW\right) \quad \text{[Equation 10]}$$

where Q is an one-dimensional Gaussian function; and $\tau_b$ is the effective multi-pulse width.

The effective multi-pulse width ($\tau_b$) included in Equation 10 may be calculated using Equation 11.

$$\tau_b = \left| \int_0^{t_b} \frac{p_{b,max}(t)}{V_{pk}} dt \right| \quad \text{[Equation 11]}$$

where $P_{b,max}(t)$ is the burst shape corresponding to a burst-scrambling code, and the maximum peak power; and $t_b$ is the time interval including all of the energy of a burst $p_b(t)$.

According to an embodiment, $t_b$ may be determined by multiplying the pulse width by the number of pulses in a duration of 20 ns.

For example, referring to FIG. 5A, it illustrates a data symbol having a pulse repetition frequency of 124.8 MHz, one segment 511 may be a region corresponding to 2 ns. The duration of 20 ns may correspond to ten segments 510. Five pulses may be included in the ten segments. $t_b$ may be determined to be 10 ns, obtained by multiplying the pulse width (2 ns) by the number (5) of pulses.

In another example, referring to FIG. 5B, it illustrates a data symbol having a pulse repetition frequency of 249.6 MHz, one segment 521 may be a region corresponding to 2 ns. The duration of 20 ns may correspond to ten segments 520. Six pulses may be included in the ten segments. $t_b$ may be determined to be 12 ns, obtained by multiplying the pulse width (2 ns) by the number (6) of pulses.

In another example, referring to FIG. 5C, it illustrates a data symbol having a pulse repetition frequency of 15.6 MHz, one period 531 may be a region corresponding to 2 ns. The duration of 20 ns may correspond to ten periods 530. Ten pulses may be included in the ten periods. $t_b$ may be determined to be 20 ns, obtained by multiplying the pulse width (2 ns) by the number (10) of pulses.

According to an embodiment, the processor 330 may adaptively adjust the peak voltage of a signal according to the frame length using the above-described methods. Therefore, the peak voltage of the signal may be increased dynamically so as to increase the transmission quality and the maximum reach distance of the signal.

Figure 6:
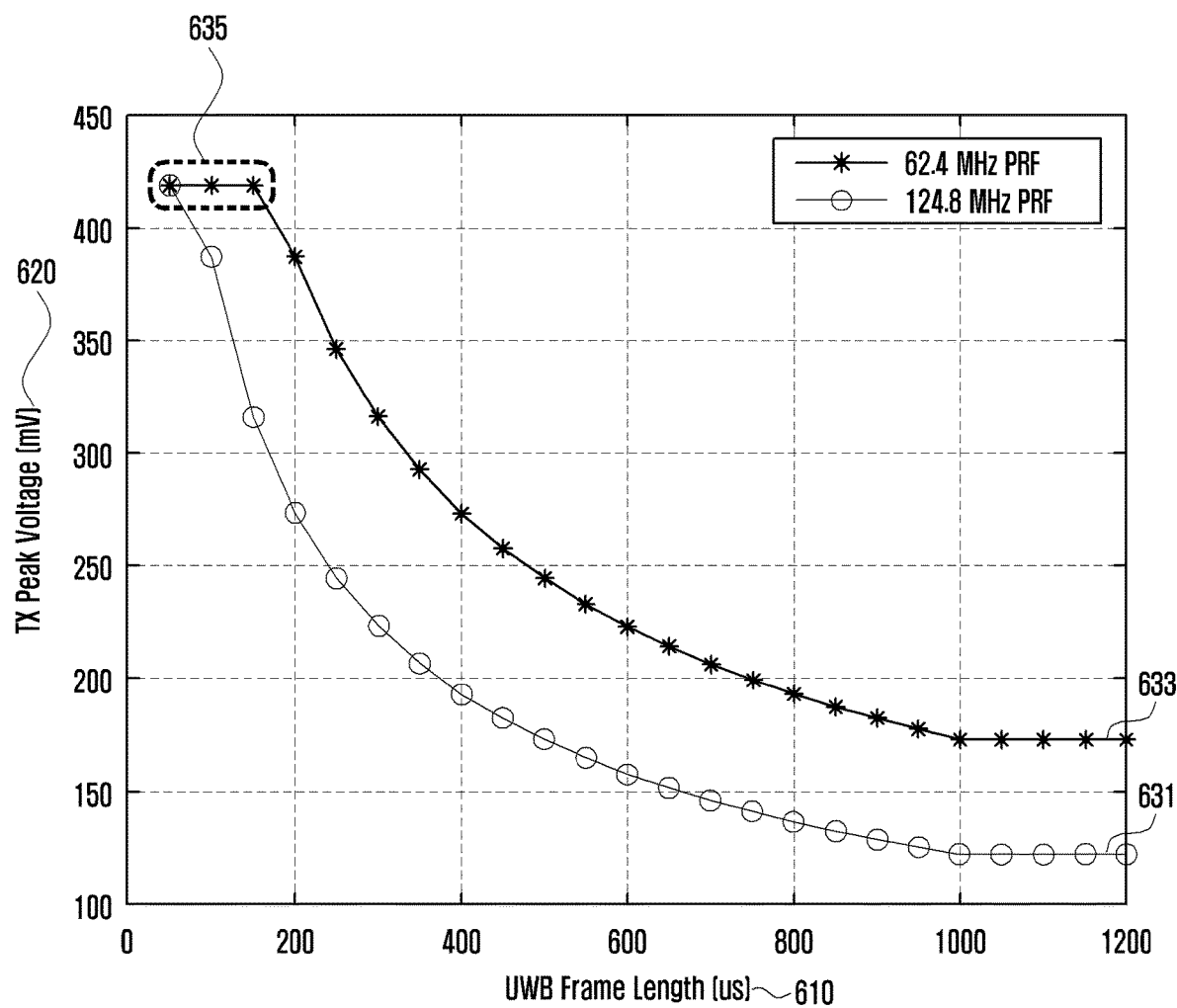
FIG. 6 is a graph illustrating a peak voltage determined according to a frame length and a pulse repetition frequency (PRF) in an electronic device according to an embodiment.

FIG. 6 is a graph illustrating a peak voltage determined according to a frame length and a pulse repetition frequency (PRF) in an electronic device according to an embodiment.

FIG. 6 illustrates changes in the peak voltage 620 as the frame length 610 changes.

According to an embodiment, the processor 330 may decrease the peak voltage 620 as the frame length 610 increases. In one example, when the pulse repetition frequency (PRF) is 124.8 MHz (631), the processor 330 may decrease the peak voltage 620 as the frame length 610 increases. In another example, when the pulse repetition frequency (PRF) is 62.4 MHz (633), the processor 330 may decrease the peak voltage 620 as the frame length 610 increases.

According to an embodiment, the processor 330 may determine the peak voltage on the basis of the pulse repetition frequency (PRF). The processor 330 may decrease the peak voltage when the pulse repetition frequency increases.

Referring to FIG. 6, it shows that the peak voltage decreases when the pulse repetition frequency increases from 62.4 MHz to 124.8 MHz, holding the frame length 610 constant. On the other hand, it is also shown that the peak voltage increases when the pulse repetition frequency decreases from 124.8 MHz to 62.4 MHz, holding the frame length 610 constant.

According to an embodiment, the processor 330 may increase the peak voltage 620 as the frame length 610 decreases. In one example, when the pulse repetition frequency (PRF) is 124.8 MHz (631), the processor 330 may increase the peak voltage 620 as the frame length 610 decreases. In another example, when the pulse repetition frequency (PRF) is 62.4 MHz (633), the processor 330 may increase the peak voltage 620 as the frame length 610 decreases.

According to an embodiment, at a specific pulse repetition frequency or less, even if the frame length decreases to a preconfigured value or less, the processor 330 may not increase the peak voltage. The peak voltage may not be increased even if the frame length decreases to the preconfigured value or less in order to prevent the peak voltage from exceeding the maximum peak power or the maximum average power stipulated by the FCC. The processor 330 may maintain the peak voltage without increasing the peak voltage when the frame length decreases to the preconfigured value or less at the specific pulse repetition frequency (PRF) or less. For example, referring to portion 635 in FIG. 6, when the frame length of the signal having pulse repetition frequency of 62.4 MHz decreases to 200 us or less, the peak voltage of the signal may be maintained without increasing it. Maintaining the peak voltage of the signal without increasing it is done for the purpose of preventing the signal from exceeding the maximum peak power or the maximum average power stipulated by the FCC. The preconfigured value may be changed based on the magnitude of the repetition frequency. For example, the preconfigured frame length value may increase as the repetition frequency decreases.

Figure 7A:
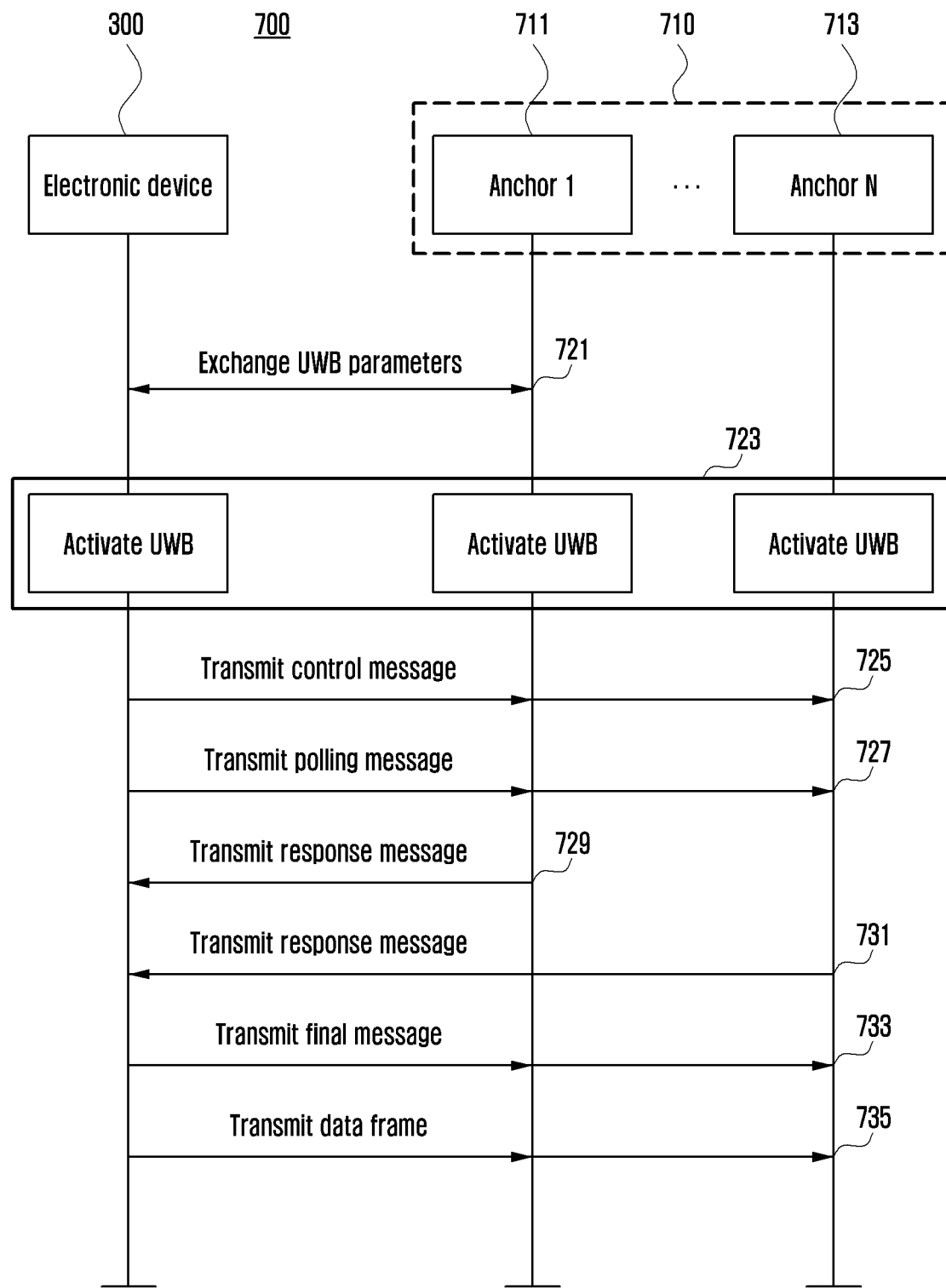
FIG. 7A is a flowchart illustrating an operation method of an electronic device according to an embodiment.

FIG. 7A is a flowchart illustrating an operation method 700 of an electronic device according to an embodiment, and FIG. 7B shows a table containing various parameters of the data to be transmitted according to an embodiment.

FIG. 7A illustrates operations in which an electronic device (e.g. the electronic device 300 in FIG. 3) transmits or receive UWB data with an external electronic device 710. The external electronic device 710 may include one or more anchors (e.g. anchor 1 711 to anchor N 713) capable of transmitting or receiving UWB signals. The external electronic device 710 may be various electronic devices (e.g. vehicle) capable of supporting the UWB communication.

According to an embodiment, in operation 721, the electronic device 300 and the external electronic device 710 may exchange UWB parameters for the UWB communication connection made therebetween.

According to an embodiment, the electronic device 300 and the external electronic device 710 may exchange the UWB parameters through other communication methods (e.g. Bluetooth, Wi-Fi, or via a cellular network).

According to an embodiment, the UWB parameters are used for the UWB communication connection between the electronic device 300 and the external electronic device 710, and at least one of the parameters shown in Table 1 may be transmitted or received.

TABLE 1

| Value | Size (Bits) | Default Value |
| --- | --- | --- |
| Start/Stop Ranging Session | 2 | 0 |
| Ranging Mode | 2 | 2 |
| Channel Number | 4 | 9 |
| Preamble Code Index | 8 | 10 |
| PHY parameter set1-Data Frame | 8 | 1 (Table 39 @ IEEE 4z draft) |
| PHY parameter set2-Rang Frame | 8 | 26 (Table 39 @ IEEE 4z draft) |
| Anchor Quantity | 8 | 8 (=N) |
| Slot Length | 16 | 2400 (2 ms) |
| Ranging Round Length | 8 | 14 (=N + 6) |
| Session ID | 32 | 0xbe 0xba 0x00 0x00 |
| Initial Ranging Interval | 24 | 120000 (100 ms) |
| Nonce | 128 | 0 (TBD) |
| Timeout | 8 | 10 (Ranging Rounds) |
| Anchor MAC address | N * 64 | 1~10 |
| Reserved | 80 | 0 |

FIG. 7A illustrates that the UWB parameters are exchanged between the electronic device 300 and a first anchor 711. However, the UWB parameters may be exchanged between the electronic device 300 and another anchor (e.g. the anchor N 713).

According to an embodiment, in operation 723, the electronic device 300 and the external electronic device 710 may activate UWB communication based on the UWB parameters, and may establish UWB communication connection therebetween.

According to an embodiment, in operation 725, the electronic device 300 may transmit a control message to the external electronic device 710. For example, one or more anchors (e.g. the first anchor 711 or the anchor N 713) may receive the control message through a multicast method.

According to an embodiment, the control message may be included in one data frame. The control message may include at least one of an advanced ranging control message, a ranging interval update (RIU) message, and a ranging scheduling (RS).

According to an embodiment, during the transmission of the control message, the electronic device 300 may determine the peak voltage of a signal corresponding to the message to be transmitted. The electronic device 300 may determine the peak voltage of the signal by using a table stored in a memory (e.g. the memory 130 in FIG. 1) of the electronic device 300.

According to an embodiment, various parameters (e.g. the length of sync data, the length of SFD, the length of STS, the length of PHY, the length of PHR, the data transmission rate, or the presence or non-presence of PHY) may be stored in a table. The various parameters may be used to determine the length of data, and may be differently configured according to a pulse repetition frequency (PRF). FIG. 7B illustrates one embodiment of a table stored in the memory 130.

According to an embodiment, in operation 727, the electronic device 300 may transmit a polling message to the external electronic device 710 through UWB communication. For example, the polling message transmitted by the electronic device 300 may be transmitted to the first anchor 711 to the anchor N 713 through the multicast method. The polling message may be used when the external electronic device 710 measures position information of the electronic device 300.

According to an embodiment, in operation 729, the first anchor 711 may transmit a response message corresponding to the polling message to the electronic device 300 through UWB communication in response to the reception of the polling message.

According to an embodiment, in operation 731, the anchor N 713 may transmit a response message corresponding to the polling message to the electronic device 300 through UWB communication in response to the reception of the polling message.

According to an embodiment, in operation 733, the electronic device 300 may transmit a final message to the external electronic device 710 through UWB communication in response to the reception of the response message. For example, one or more anchors (e.g. the first anchor 711 to the anchor N 713) may receive the final message through the multicast method.

According to an embodiment, data transmitted in operation 727 to operation 733 may be in the configuration of the fourth PPDU 440 shown in FIG. 4A. In the fourth PPDU 440, there is no PHY payload (e.g. the PHY payload 417, 429, or 437 in FIG. 4A).

According to an embodiment, in operation 735, the electronic device 300 may transmit an additional data frame to the external electronic device 710 through UWB communication. For example, one or more anchors (e.g. the first anchor 711 or the anchor N 713) may receive the additional data frame through the multicast method.

The electronic device 300 may transmit, to the external electronic device 710, a data frame including a ranging reply time deferred (RRTD) or a ranging round trip measurement (RRTM). The external electronic device 710 may determine the relative position information between the electronic device 300 and the external electronic device 710 on the basis of the RRTD or the RRTM included in the data frame.

According to an embodiment, each message transmitted or received in operations 721 to 735 may be contained in one frame, and the length of the frame may be the length of each message. The specific method for determining the length of the frame has been described with reference to FIGS. 4A and 4B.

According to an embodiment, in operations 721 to 733, the electronic device 300 may adjust, according to the size of data to be transmitted, the peak voltage of the signal including the data. For example, when a data frame for, for example, the control message, has a data size of 127 bytes and a ranging frame for, for example, the polling message, response message, or final message, has a data size of 100 bytes, the length of the data frame may be 317.37 s and the length of the ranging frame may be 140.96 s. The electronic device 300 may configure the peak voltage of the signal including the ranging frame to be larger than the peak voltage of the signal including the data frame. In the case of the repetition frequency of 62.4 MHz illustrated in FIG. 6, the electronic device 300 may use 2.6911 dB more power for the ranging frame than for the peak voltage of the data frame. In the case of the repetition frequency of 124.8 MHz illustrated in FIG. 6, the electronic device 300 may use 8.509 dB more power for the ranging frame than for the peak voltage of the data frame.

An electronic device according to an embodiment includes: a first communication circuit configured to perform a first communication using an ultra-wide band (UWB) communication scheme and a processor. The processor may control the communication circuit to: identify, based on a characteristic of data to be transmitted using the first communication circuit, a frame length of the data to be transmitted; determine, based on the identified frame length, a peak voltage of a signal containing the data to be transmitted; and transmit the data using the signal having the determined peak voltage.

In the electronic device according to an embodiment, the processor may be configured to: determine a first voltage, based on the identified frame length and maximum allowable average power of the signal; determine a second voltage related to maximum allowable peak power of the signal; and determine the peak voltage of the signal to be a lower one of the first voltage and the second voltage.

In the electronic device according to an embodiment, the first voltage may be determined based on a parameter that varies depending on a comparison between the frame length and a preconfigured value.

In the electronic device according to an embodiment, the processor may be configured to: increase the peak voltage of the signal when the frame length of the data to be transmitted decreases as compared to previously transmitted data; and decrease the peak voltage of the signal when the frame length of the data to be transmitted increases as compared to the previously transmitted data.

In the electronic device according to an embodiment, the processor may be configured to maintain the peak voltage of the signal when the frame length decreases to a preconfigured value or less, wherein the preconfigured value may be determined based on a pulse repetition frequency (PRF) corresponding to the signal.

In the electronic device according to an embodiment, the processor may determine the peak voltage such that average power of the signal does not exceed a preconfigured value.

In the electronic device according to an embodiment, the processor may determine the peak voltage such that maximum output power of the signal does not exceed a preconfigured value.

In the electronic device according to an embodiment, the processor may be configured to: identify the pulse repetition frequency (PRF) corresponding to the signal; and determine the peak voltage based on the PRF.

In the electronic device according to an embodiment, the peak voltage may be inversely proportional to the PRF.

The electronic device according to an embodiment may further include a second communication circuit configured to a second communication using a different communication scheme, wherein the processor may be configured to: connect to an external electronic device that receives the data using the second communication; exchange parameters for connection for the first communication with the external electronic device using the second communication; and determine the peak voltage, based on the exchanged parameters.

In the electronic device according to an embodiment, the characteristic of the data may include information on a type of the data or on at least one field included in the data.

Figure 8:
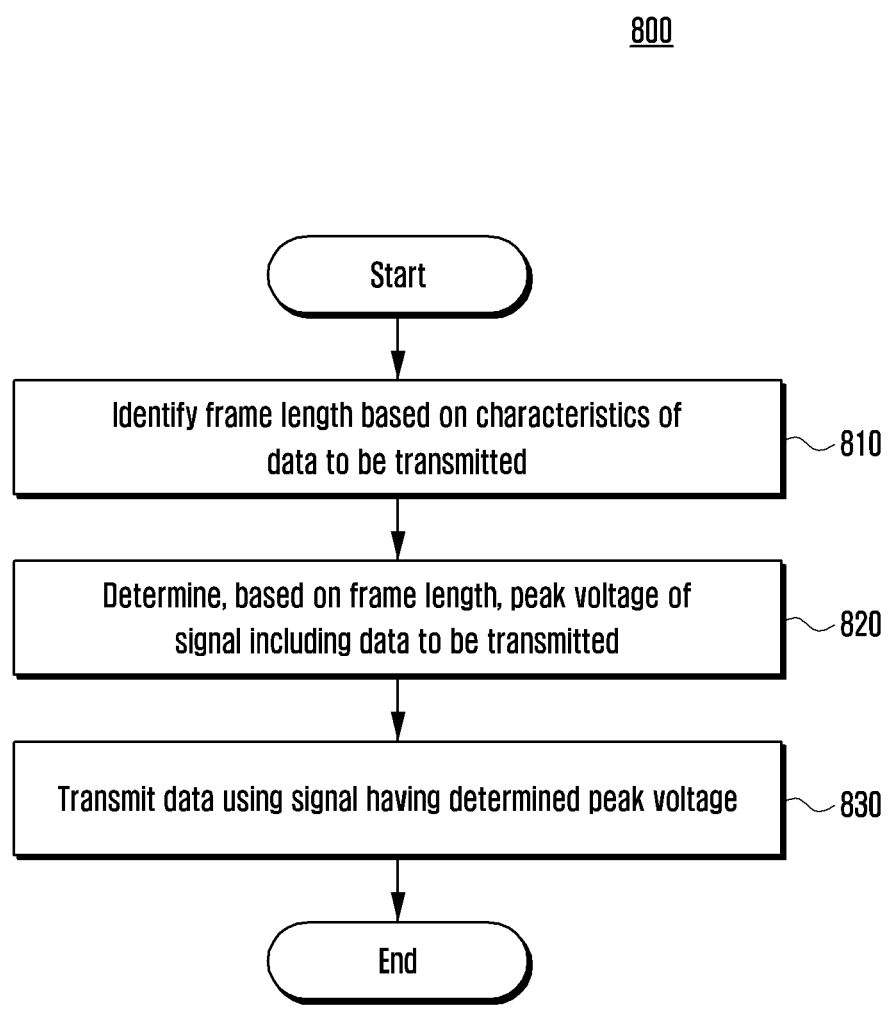
FIG. 8 is a flowchart illustrating an operation method of an electronic device according to an embodiment.

FIG. 8 is a flowchart illustrating an operation method of an electronic device according to an embodiment.

Referring to FIG. 8, in operation 810, an electronic device (e.g. the electronic device 300 in FIG. 3) according to an embodiment may identify a frame length on the basis of the characteristics of data to be transmitted.

According to an embodiment, the frame length may be the difference between the data transmission start time and the data transmission completion time. The frame length may change depending on the various fields (which are the fields defined in IEEE 802.15.4 and may be at least one of, for example, SYNC, SFD, PHY, PHR, or STS) included in the frame.

According to an embodiment, in operation 820, the electronic device 300 may determine, based on the frame length, the peak voltage of the signal including data to be transmitted.

A specific embodiment for determining the peak voltage of a signal has been described with reference to FIGS. 5A to 5C. The electronic device 300 may decrease the peak voltage as the frame length increases as compared to previously transmitted data, and may increase the peak voltage as the frame length decreases as compared to previously transmitted data.

According to an embodiment, the electronic device 300 may adaptively adjust the peak voltage of the signal according to the length of frame. Therefore, increasing the peak voltage of the signal dynamically may increase the transmission quality and the maximum reach distance of the signal.

According to an embodiment, the electronic device 300 may adaptively adjust the peak voltage of the signal according to pulse repetition frequency (PRF). The electronic device 300 may decrease the peak voltage when the pulse repetition frequency increases. The electronic device 300 may increase the peak voltage when the pulse repetition frequency decreases. Therefore, increasing the peak voltage of the signal dynamically this way may increase the transmission quality and the maximum reach distance of the signal.

According to an embodiment, in operation 830, the electronic device 300 may transmit data using the signal having the determined peak voltage.

An operation method of an electronic device according to an embodiment may include: generating data to be transmitted using a first communication circuit configured to perform a first communication using an ultra-wide band (UWB) communication scheme; identifying a frame length of the generated data; determining, based on the identified frame length, a peak voltage of a signal containing the data to be transmitted; and transmitting the data using the signal having the determined peak voltage.

In the operation method of the electronic device according to an embodiment, the determining of the peak voltage may include: determining a first voltage, based on the identified frame length and maximum allowable average power of the signal; determining a second voltage related to maximum allowable peak power of the signal; and determining the peak voltage of the signal to be a lower one of the first voltage and the second voltage.

In the operation method of the electronic device according to an embodiment, the first voltage may be determined based on a parameter that varies depending on a comparison between the frame length and a preconfigured value.

The operation method of the electronic device according to an embodiment may further include: increasing the peak voltage of the signal when the frame length of the data to be transmitted decreases as compared to previously transmitted data; and decreasing the peak voltage of the signal when the frame length of the data to be transmitted increases as compared to the previously transmitted data.

The operation method of the electronic device according to an embodiment may further include maintaining the peak voltage of the signal when the frame length decreases to a preconfigured value or less, wherein the preconfigured value is determined based on a pulse repetition frequency (PRF) corresponding to the signal.

In the operation method of the electronic device according to an embodiment, the peak voltage may be determined such that average power of the signal does not exceed a preconfigured value.

In the operation method of the electronic device according to an embodiment, the peak voltage may be determined such that maximum output power of the signal does not exceed a preconfigured value.

In the operation method of the electronic device according to an embodiment, the determining of the peak voltage may include: identifying the pulse repetition frequency (PRF) corresponding to the signal; and determining the peak voltage based on the PRF.

In the operation method of the electronic device according to an embodiment, the peak voltage may be inversely proportional to the PRF.

The operation method of the electronic device according to an embodiment may further include: establishing a connection with an external electronic device that receives the data using a second communication different from the first communication; exchanging parameters for connection for the first communication with the external electronic device; and determining the peak voltage based on the exchanged parameters.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a first communication circuit configured to perform a first communication using an ultra-wide band (UWB) communication scheme; and
a processor,
wherein the processor controls the first communication circuit to:
identify, based on a characteristic of a PHY Protocol Data Unit (PPDU) to be transmitted using the first communication circuit, a frame length of the PPDU to be transmitted;
determine, based on the frame length, a peak voltage of a signal representing the PPDU to be transmitted, wherein the peak voltage increases as the frame length decreases; and
transmit the PPDU using the signal representing the PPDU with the peak voltage; and
wherein the processor is further configured to:
maintain the peak voltage of the signal when the frame length is less than a preconfigured value, wherein the preconfigured value is determined based on a pulse repetition frequency (PRF) corresponding to the signal.

2. The electronic device of claim 1, wherein the processor is further configured to:
determine a first voltage, based on the frame length and maximum allowable average power of the signal;
determine a second voltage related to maximum allowable peak power of the signal; and
determine the peak voltage of the signal to be a lower one of the first voltage and the second voltage.

3. The electronic device of claim 2, wherein the first voltage is determined based on a parameter that varies depending on a comparison between the frame length and a preconfigured value.

4. The electronic device of claim 1, wherein the processor is further configured to:
increase the peak voltage of the signal when the frame length of the PPDU to be transmitted decreases as compared to previously transmitted PPDU; and
decrease the peak voltage of the signal when the frame length of the PPDU to be transmitted increases as compared to the previously transmitted PPDU.

5. The electronic device of claim 1, wherein the processor is further configured to determine the peak voltage such that average power of the signal does not exceed a preconfigured value.

6. The electronic device of claim 1, wherein the processor is further configured to determine the peak voltage such that maximum output power of the signal does not exceed a preconfigured value.

7. The electronic device of claim 1, wherein the processor is further configured to:
identify a pulse repetition frequency (PRF) corresponding to the signal; and determine the peak voltage based on the PRF, wherein the peak voltage increases as the PRF decreases for a same frame length.

8. The electronic device of claim 7, wherein the peak voltage is inversely proportional to the PRF.

9. The electronic device of claim 1, further comprising a second communication circuit configured to a second communication using a different communication scheme, wherein the processor is further configured to:
connect, using the second communication, to an external electronic device that receives the PPDU;
exchange parameters for connection for the first communication with the external electronic device using the second communication; and
determine the peak voltage based on the exchanged parameters.

10. The electronic device of claim 1, wherein the PPDU comprises a header and payload, and the characteristic of the PPDU comprises a length of the header and a length of the payload, and wherein transmitting the PPDU comprises transmitting the header and the payload using the signal representing the PPDU with the peak voltage.

11. An operation method of an electronic device, comprising:
generating a PHY Protocol Data Unit (PPDU) to be transmitted using a first communication circuit configured to perform a first communication using an ultra-wide band (UWB) communication scheme;
identifying a frame length of the PPDU;
determining, based on the frame length, a peak voltage of a signal representing the PPDU to be transmitted, wherein the peak voltage increases as the frame length decreases; and
transmitting the PPDU using the signal representing the PPDU with the peak voltage; and
wherein the method is further comprising:
maintaining the peak voltage of the signal when the frame length is less than a preconfigured value, wherein the preconfigured value is determined based on a pulse repetition frequency (PRF) corresponding to the signal.

12. The operation method of claim 11, wherein determining of the peak voltage further comprises:
determining a first voltage, based on the frame length and maximum allowable average power of the signal;
determining a second voltage related to maximum allowable peak power of the signal; and
determining the peak voltage of the signal to be a lower one of the first voltage and the second voltage.

13. The operation method of claim 12, wherein the first voltage is determined based on a parameter that varies depending on a comparison between the frame length and a preconfigured value.

14. The operation method of claim 11, further comprising:
increasing the peak voltage of the signal when the frame length of the PPDU to be transmitted decreases as compared to a previously transmitted PPDU; and
decreasing the peak voltage of the signal when the frame length of the PPDU to be transmitted increases as compared to the previously transmitted PPDU.

15. The operation method of claim 11, wherein the peak voltage is determined such that average power of the signal does not exceed a preconfigured value.

16. The operation method of claim 11, wherein the peak voltage is determined such that maximum output power of the signal does not exceed a preconfigured value.

17. The operation method of claim 11, wherein determining of the peak voltage further comprises:
identifying a pulse repetition frequency (PRF) corresponding to the signal; and
determining the peak voltage based on the PRF, wherein the peak voltage increases as the PRF decreases for a same frame length.

18. The operation method of claim 17, wherein the peak voltage is inversely proportional to the PRF.

19. The operation method of claim 11, wherein the PPDU comprises a header and payload, and a characteristic of the PPDU comprises a length of the header and a length of the payload, and wherein transmitting the PPDU comprises transmitting the header and the payload using the signal representing the PPDU with the peak voltage.

* * * * *